United States Patent
Wurm et al.

(10) Patent No.: US 12,391,126 B2
(45) Date of Patent: Aug. 19, 2025

(54) METHOD FOR INCREASING THE POWER DURING AN ACCELERATION PROCESS OF AN ELECTRICALLY OPERATED MOTOR VEHICLE

(71) Applicant: MAGNA Powertrain GmbH & Co KG, Lannach (AT)

(72) Inventors: Stefan Wurm, Eferding (AT); Thomas Traidl, Linz (AT); Simon Kaimer, Heiligenkreuz am Waasen (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 222 days.

(21) Appl. No.: 18/267,610

(22) PCT Filed: Dec. 2, 2021

(86) PCT No.: PCT/EP2021/083900
§ 371 (c)(1),
(2) Date: Jun. 15, 2023

(87) PCT Pub. No.: WO2022/128498
PCT Pub. Date: Jun. 23, 2022

(65) Prior Publication Data
US 2024/0042871 A1    Feb. 8, 2024

(30) Foreign Application Priority Data
Dec. 16, 2020    (DE) ............ 10 2020 216 078.3

(51) Int. Cl.
*B60L 15/20*    (2006.01)
*B60L 50/30*    (2019.01)

(52) U.S. Cl.
CPC ....... *B60L 15/2045* (2013.01); *B60L 15/2054* (2013.01); *B60L 15/2072* (2013.01);
(Continued)

(58) Field of Classification Search
CPC ............ B60L 15/2045; B60L 15/2054; B60L 15/2072; B60L 15/209; B60W 10/02;
(Continued)

(56) References Cited

U.S. PATENT DOCUMENTS 7,936,076 B2 * 5/2011 Hsu ................. B60W 10/08
290/1 A
10,730,394 B2 * 8/2020 Ayala ................. B60L 7/16
(Continued)

FOREIGN PATENT DOCUMENTS

DE    8602144 U1    10/1992
DE    10209514 A1    10/2002
(Continued)

OTHER PUBLICATIONS

European Patent Office, Rijswijk, Netherlands, International Search Report of International Application No. PCT/EP2021/083900, Mailed Mar. 3, 2022, 2 pages.

*Primary Examiner* — Tyler J Lee
(74) *Attorney, Agent, or Firm* — Dickinson Wright PLLC

(57) ABSTRACT

A method for increasing the power during an acceleration process of an electrically operated motor vehicle with at least one electrical machine includes detecting a storage request by at least one control unit and initiating an increase in the rotation speed of a rotor of the electrical machine of the motor by the control unit before an acceleration request, so that kinetic energy is stored in the rotor of the electrical machine. The acceleration request is detected by the control unit and the energy stored in the rotor of the electrical machine is released during the acceleration process.

18 Claims, 10 Drawing Sheets

(52) U.S. Cl.
CPC ............ *B60L 15/209* (2013.01); *B60L 50/30* (2019.02); *B60L 2240/14* (2013.01); *B60L 2240/421* (2013.01); *B60L 2240/486* (2013.01); *B60L 2240/507* (2013.01)

(58) Field of Classification Search
CPC .................. B60W 10/08; B60W 10/10; F16H 2003/0818; Y02T 10/64
See application file for complete search history.

(56) References Cited

U.S. PATENT DOCUMENTS

| | | | |
|---|---|---|---|
| 2008/0173486 A1* | 7/2008 | Hsu | B60L 50/40 322/4 |
| 2010/0031910 A1 | 2/2010 | Seufert et al. | |
| 2015/0283893 A1* | 10/2015 | Descombes | F16D 47/04 903/903 |
| 2016/0264003 A1* | 9/2016 | Yokoyama | B60L 15/2009 |
| 2018/0093576 A1* | 4/2018 | Ayala | H02K 7/106 |

FOREIGN PATENT DOCUMENTS

| | | |
|---|---|---|
| DE | 102009009809 A1 | 8/2010 |
| DE | 102012015961 A1 | 2/2014 |
| EP | 3419848 A1 | 1/2019 |

\* cited by examiner

METHOD FOR INCREASING THE POWER DURING AN ACCELERATION PROCESS OF AN ELECTRICALLY OPERATED MOTOR VEHICLE

CROSS-REFERENCE TO RELATED APPLICATIONS

This application is a National Stage of International Application No. PCT/EP2021/083900, filed Dec. 2, 2021, which claims priority to DE 10 2020 216 078.3, filed Dec. 16, 2020. The entire disclosures of each of the above applications are incorporated herein by reference.

FIELD

The present disclosure relates to a method for increasing the power during an acceleration process of an electrically operated motor vehicle having at least one electrical machine.

BACKGROUND

Electrical machines of electrically operated motor vehicles usually have a high mass inertia and a high speed level. Rotors thus have a large amount of kinetic energy stored at high speeds.

SUMMARY

This section provides a general summary of the disclosure, and is not a comprehensive disclosure of its full scope or all of its features.

It is an object of the present disclosure to specify a method for increasing the power during an acceleration process of an electrically operated motor vehicle that makes use of the energy storage potential of a driving electrical machine of the electric motor vehicle.

This demand can be covered by the subject matter of the present disclosure disclosed herein. Advantageous embodiments of the present disclosure are described throughout.

The method according to the present disclosure is used to increase the power ("boost") during an acceleration process of an electrically operated motor vehicle.

The electrically operated motor vehicle includes at least one electrical machine and a control unit for this purpose.

The electrical machine has a structure typical to a person skilled in the art, having a rotor as the rotating component and a stator as the static component. The electrical machine can be embodied as an internal rotor machine or external rotor machine. The rotor of the electrical machine includes a rotor shaft and a rotor core fixedly arranged on the rotor shaft.

A control unit can be understood in this context as a control component, which includes one or more, namely at least two, processors.

According to the method according to the present disclosure, a storage request is detected by the control unit and an increase of the speed of a rotor of the electrical machine of the motor vehicle is initiated by the control unit before an acceleration request, so that kinetic energy is stored in the rotor of the electrical machine. The energy for revving up the rotor can either be provided by the electrical machine itself or recovered from the kinetic energy of the motor vehicle.

In this context, a "detection of a storage request" can be understood, for example, as detecting a deceleration process of the motor vehicle, such as, for example, initial braking before cornering or a (decelerating) braking maneuver before an acceleration process, and detecting an upcoming acceleration process of the motor vehicle, for example detecting an upcoming starting process, namely starting the motor vehicle from a standstill. The storage request is at the beginning of a storage process of kinetic energy in the rotor of the electrical machine.

A "detection of an acceleration request" can be the detection of a starting process, thus starting a motor vehicle from a standstill, detecting an acceleration out of a curve or detecting an overtaking process. All of these driving situations, namely starting process, acceleration out of a curve, and overtaking process, correspond to an acceleration process of the motor vehicle. However, an acceleration request can also take place in any arbitrary driving situation, namely, for example, at the wish of the motor vehicle driver. The method taking place here for generating a "boost" during the acceleration process corresponds to the method taking place during an overtaking process as an acceleration process. The acceleration request is at the beginning of an acceleration process.

According to the present disclosure, the acceleration request is detected by the control unit and a release of the energy stored in the rotor of the electrical machine is initiated. In this way, the previously stored energy is released as a "boost" during the actual acceleration process.

With respect to a simple time sequence of the method, the detection of a storage request is at the beginning, followed by the storage of the kinetic energy in the rotor of the electrical machine, and then the detection of the acceleration request followed by the release of the kinetic energy during the acceleration process.

The storage request and thus the storage of the kinetic energy in the rotor of the electrical machine is preferably automatically initiated. How and when the kinetic energy is stored in the rotor of the electrical machine can be decided by a predictive method strategy stored in the control unit. For example, the control unit detects by way of sensors (oncoming traffic detection, course of the road detection, driving behavior, driver input, etc.), that an upcoming overtaking process is desired and safely possible by the driver in a few seconds. The control unit thereupon initiates the active revving-up of the rotor in order to temporarily store kinetic energy. A manual initiation, namely, for example, via the actuation of one or more operating elements by a motor vehicle driver, of the storage request and thus the storage of the kinetic energy in the rotor of the electrical machine is also possible, however.

The storage of the kinetic energy in the rotor of the electrical machine can be carried out upon detection of an upcoming acceleration process by the drive power of the electrical machine and/or during a deceleration process which is taking place by storing the deceleration energy.

The acceleration request and thus the release of the stored energy during the actual acceleration process can be initiated manually, namely, for example, via the actuation of one or more operating elements by a motor vehicle driver, or automatically, namely, for example, by running, i.e., permanent, detection of driving states and trigger processes stored in the control unit.

At least one clutch is particularly preferably arranged in a power path between the electrical machine and driven wheels of the motor vehicle, wherein the energy stored in the rotor of the electrical machine is released via at least partially closing the clutch.

One preferred first embodiment of the method is implementable in a component configuration in which a transmission, which includes at least one clutch, is assigned to the electrical machine, wherein the energy stored in the rotor of the electrical machine is released via at least partially closing the clutch.

The transmission assigned to the electrical machine includes two gear levels, namely a first gear level and a second gear level, wherein the gear levels are each shiftable via the at least one clutch. However, the first gear level can also be shiftable using one clutch and the second gear level using a further clutch.

The first gear level is an odd gear level having a higher transmission ratio in comparison to the second gear level. Accordingly, the second gear level is an even gear level having a lower transmission ratio in comparison to the first gear level.

In the first embodiment of the method, at least partial opening of the clutch is preferably controlled or regulated by the control unit upon detection of a storage request, so that the speed of the rotor of the electrical machine of the motor vehicle is increased by the drive power of the electrical machine and kinetic energy is stored in the rotor of the electrical machine, wherein a release of the kinetic energy stored in the rotor by at least partially closing the clutch is controlled or regulated by the control unit upon a detected acceleration request.

At least partially opening the clutch can be controlled or regulated by the control unit upon detection of an upcoming acceleration process, so that the speed of the rotor of the electrical machine of the motor vehicle is increased and kinetic energy is stored in the rotor of the electrical machine, wherein a release of the kinetic energy stored in the rotor is controlled or regulated by the control unit by at least partially closing the clutch upon detection of an acceleration request.

Opening the at least one clutch can be controlled or regulated by the control unit upon detection of an upcoming starting process, so that the speed of the rotor of the electrical machine of the motor vehicle is increased and kinetic energy is stored in the rotor of the electrical machine, wherein a release of the kinetic energy stored in the rotor by at least partially closing the clutch is controlled or regulated by the control unit upon a start of the motor vehicle from a standstill.

A thrust downshift from the second gear level into the first gear level can be controlled or regulated by the control unit upon detection of a deceleration process, so that the speed of the rotor of the electrical machine of the motor vehicle is increased and kinetic energy is stored in the rotor of the electrical machine. Furthermore, an acceleration request can be detected by the control unit and a release of the kinetic energy stored in the rotor of the electrical machine can be controlled or regulated by a traction upshift from the first gear level into the second gear level.

A furthermore preferred second embodiment of the method is implementable in a component configuration in which the electrical machine is connected directly or indirectly, namely via a transmission, in a drive-active manner to an axle of the motor vehicle, wherein the axle includes a clutch for continuous torque distribution on each of its half-shafts ("twin clutch"). The transmission can be, for example, a transmission as described above.

In the second embodiment of the method, at least partial opening of the clutches is preferably controlled or regulated by the control unit upon detection of a storage request, so that the speed of the rotor of the electrical machine of the motor vehicle is increased and kinetic energy is stored in the rotor of the electrical machine, wherein a release of the kinetic energy stored in the rotor by at least partially closing the clutches during the acceleration process is controlled or regulated by the control unit upon detection of an acceleration request.

At least partial opening of the clutches can be controlled or regulated by the control unit upon detection of an upcoming acceleration process, so that the speed of the rotor of the electrical machine of the motor vehicle is increased and kinetic energy is stored in the rotor of the electrical machine, wherein a release of the kinetic energy stored in the rotor by closing the clutches is controlled or regulated by the control unit upon detection of an acceleration request.

Opening of the clutches can be controlled or regulated by the control unit upon detection of an upcoming starting process, so that the speed of the rotor of the electrical machine of the motor vehicle is increased and kinetic energy is stored in the rotor of the electrical machine, wherein a release of the kinetic energy stored in the motor by at least partially closing the clutches is controlled or regulated by the control unit upon starting of the motor vehicle from a standstill.

At least partially opening the clutches can be controlled or regulated by the control unit upon detection of a deceleration process. Furthermore, a release of the kinetic energy stored in the rotor by at least partially closing the clutches can be controlled or regulated by the control unit upon detection of an acceleration request.

Both embodiment may thus also be applied from a standstill of the motor vehicle (starting process; "race start"). In this case, the rotor of the electrical machine is revved up with opened clutches prior to the acceleration process. During the acceleration process, at least one clutch is closed in a controlled manner in order to release the kinetic energy stored in at least one rotor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

DETAILED DESCRIPTION

Figure 1:
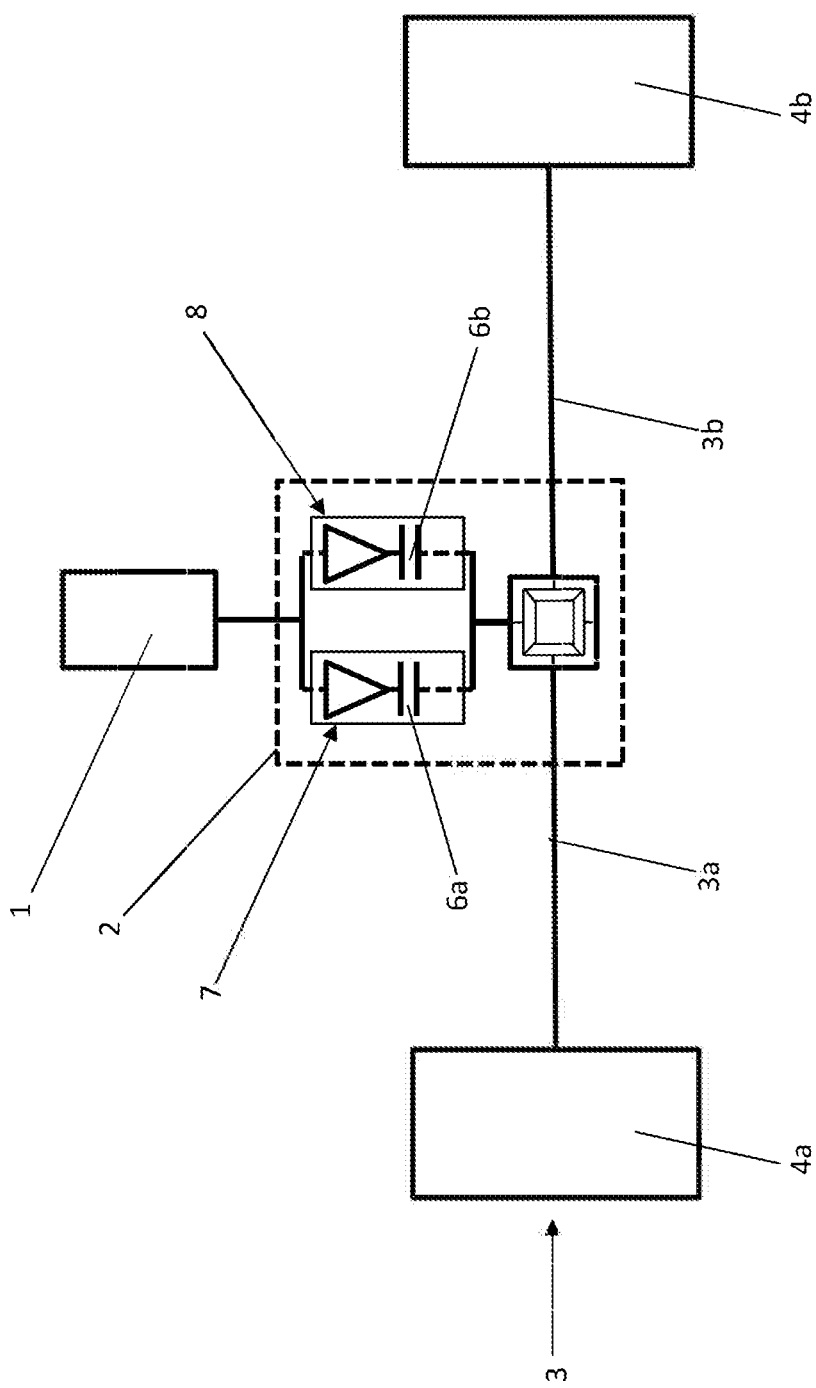
FIG. 1 shows a generic schematic illustration of a drive arrangement of an electrically operated motor vehicle which is suitable for carrying out a first embodiment of a method according to the present disclosure.

FIG. 1 generically shows an exemplary drive arrangement of an electrically operated motor vehicle, which is suitable for carrying out a first embodiment of a method according to the present disclosure.

The drive arrangement shown in FIG. 1 includes an electrical machine 1, which is connectable in a drive-active manner via a transmission 2 to an axle 3 (front and/or rear axle) of the motor vehicle. The axle 3 includes two half-shafts 3a, 3b, at the end of each of which at least one wheel 4a, 4b is arranged. The transmission 2 includes two gear levels, namely a first gear level 7 and a second gear level 8, and two clutches, namely a first clutch 6a and a second clutch 6b. Two torque paths having different transmission ratio result therefrom, which can be used depending which clutch 6a, 6b is closed. If both clutches 6a, 6b are open, the electrical machine 1 is thus completely decoupled from the axle 3 and thus from the wheels 4a, 4b.

Figure 2:
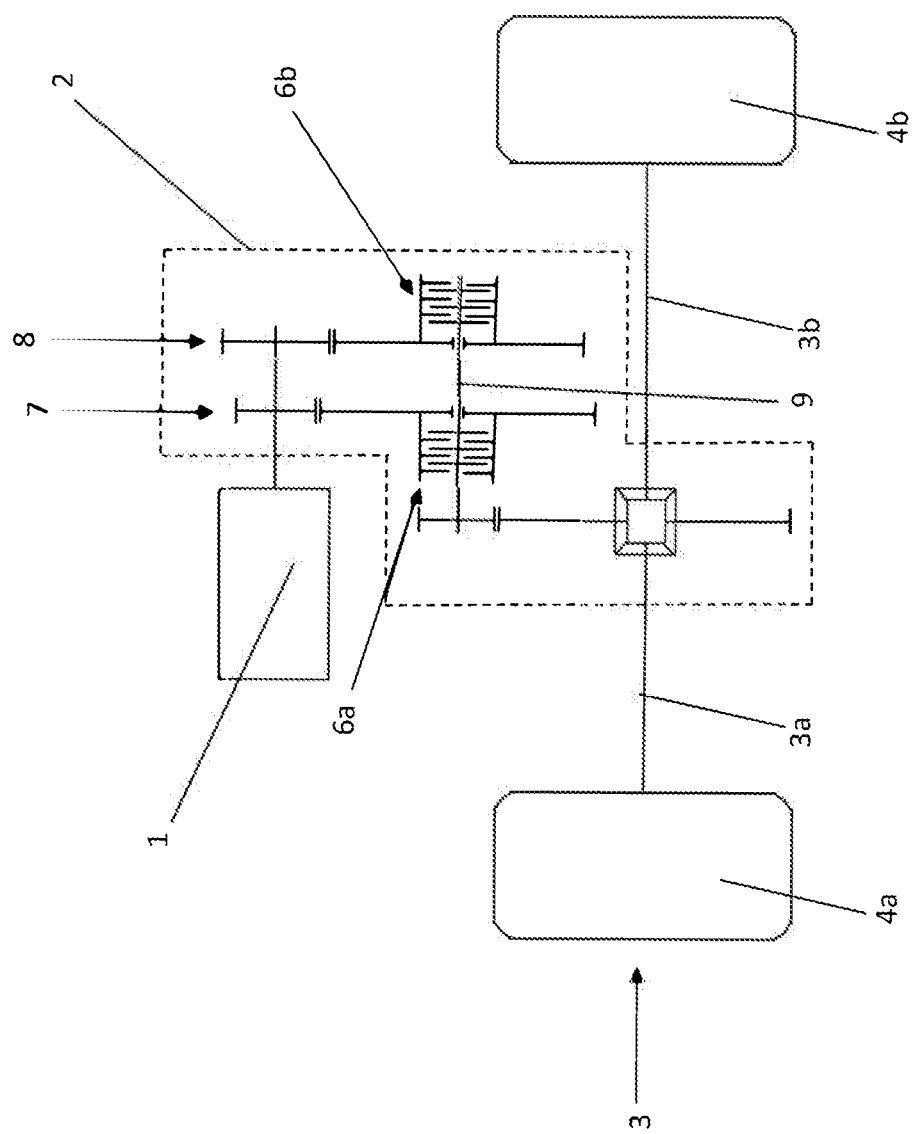
FIG. 2 shows a schematic illustration of a technical implementation of a drive arrangement of an electrically operated motor vehicle which is suitable for carrying out a first embodiment of a method according to the present disclosure according to FIG. 1.

FIG. 2 shows a more detailed illustration of an embodiment of a two-gear "e-drive" system as described in FIG. 1. The transmission ratios or two gear levels 7, 8 are implemented in this case via two spur gear levels each having a fixed gear and an idler gear. The two idler gears are arranged on a common intermediate shaft 9 and are each connectable in a drive-active manner via one of the two clutches 6a, 6b to the intermediate shaft 9. If the first clutch 6a is closed and the second clutch 6b is opened, the idler gear of the first gear level 7 on the intermediate shaft 9 is thus connected thereto in a drive-active manner and the first gear is engaged. If the second clutch 6b is closed and the first clutch 6a is opened, the idler gear of the second gear level 8 is thus connected in a drive-active manner to the intermediate shaft 9 and the second gear is engaged. By regulated opening of one clutch 6a, 6b and simultaneous regulated closing of the respectively other clutch 6a, 6b, it is possible to change between the gears without interruption of traction force. FIG. 2 is only to show an embodiment variant—in principle, however, it is not relevant for the method according to the present disclosure how the two gear nature is implemented as long as it is a power-shift transmission 2 which is driven by an electrical machine 1. Accordingly, the method according to the present disclosure can be used not only in spur gear transmissions, but also, for example, in planetary gears.

Figure 3:
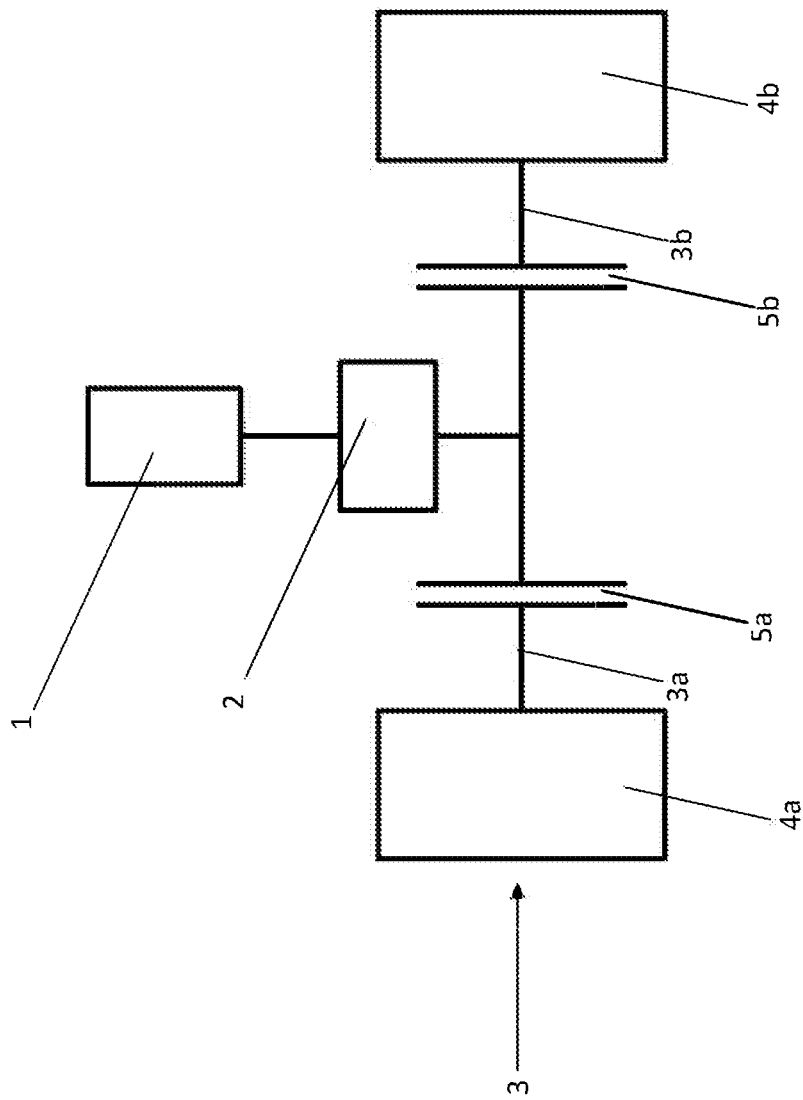
FIG. 3 shows a schematic illustration of a drive arrangement of an electrically operated motor vehicle which is suitable for carrying out a second embodiment of a method according to the present disclosure.

FIG. 3 shows a schematic illustration of a drive arrangement of an electrically operated motor vehicle which is suitable for carrying out a second embodiment of a method according to the present disclosure. The electrical machine 1 is connected indirectly, namely via a transmission 2, in a drive-active manner to the axle 3 (front and/or rear axle) of the motor vehicle. The axle 3 includes two half-shafts 3a, 3b, at the end of which at least one wheel 4a, 4b is arranged in each case. A clutch 5a, 5b is arranged on each half-shaft 3a, 3b. This arrangement is also designated as a "twin clutch" arrangement, wherein the two clutches 5a, 5b are to be understood under the designation "twin clutch" hereinafter.

Figure 4:
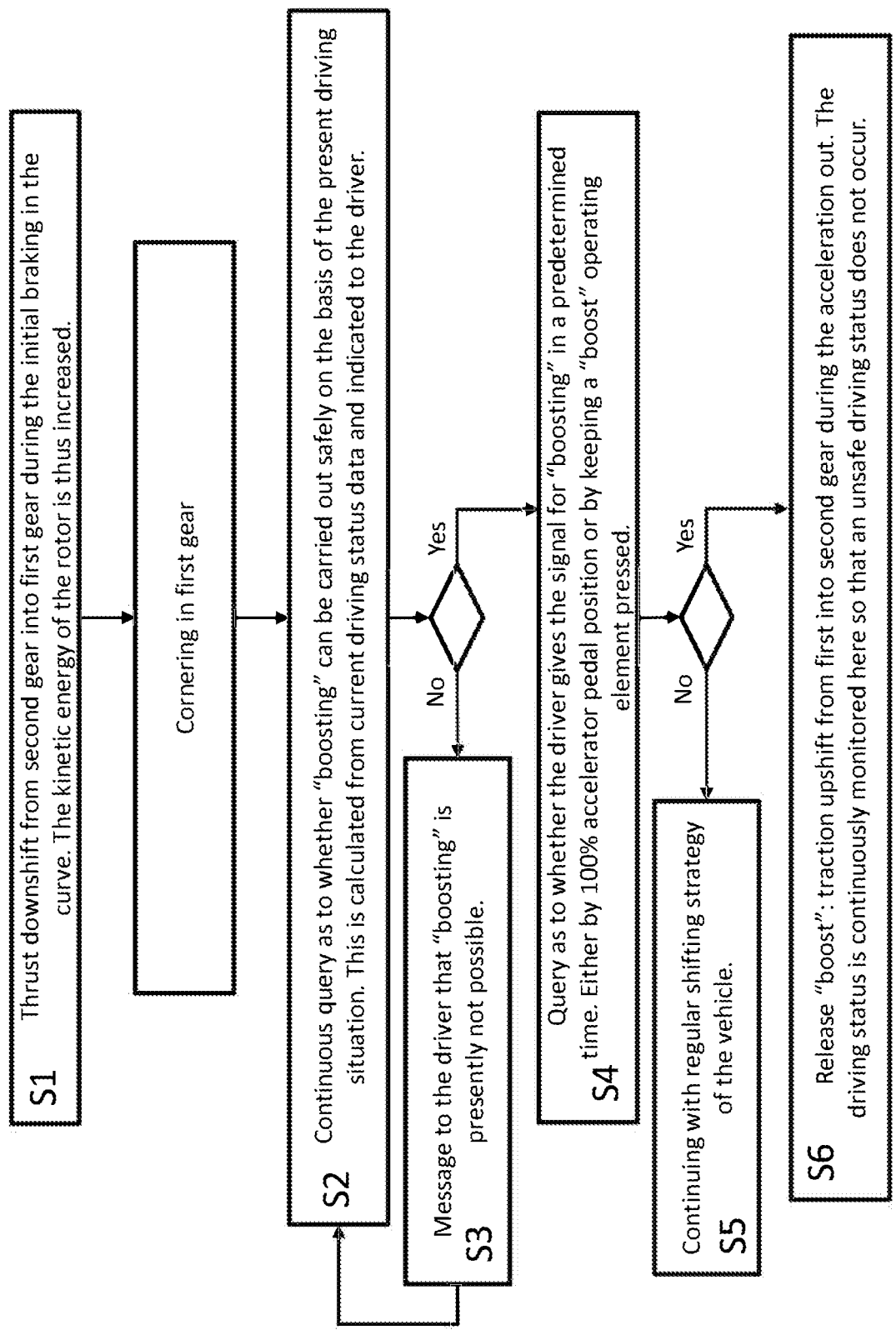
FIG. 4 shows a first flow chart corresponding to a first embodiment of a method according to the present disclosure during cornering of a motor vehicle.
Figure 5:
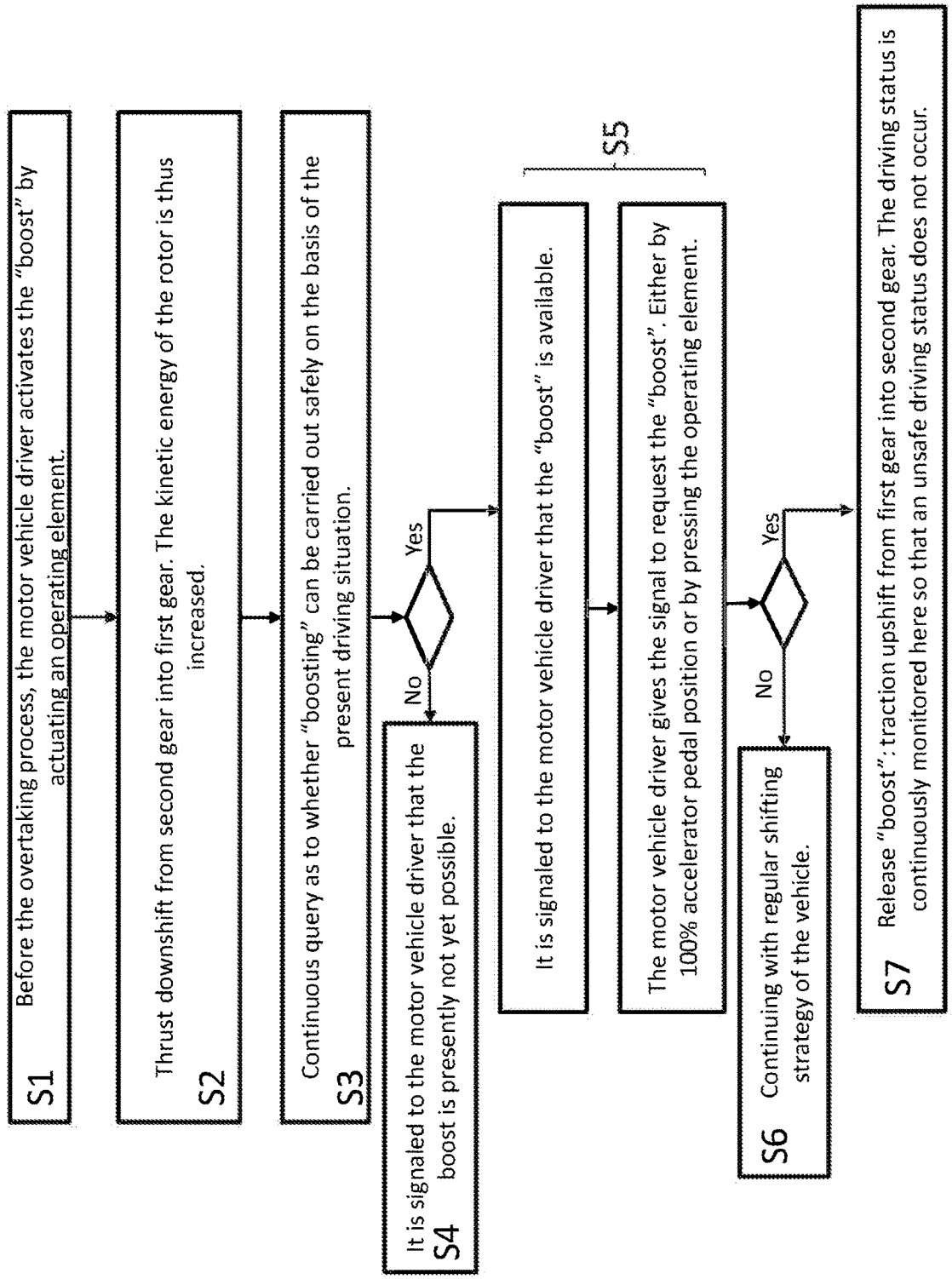
FIG. 5 shows a second flow chart corresponding to a first embodiment of a method according to the present disclosure during an overtaking process of a motor vehicle.
Figure 6:
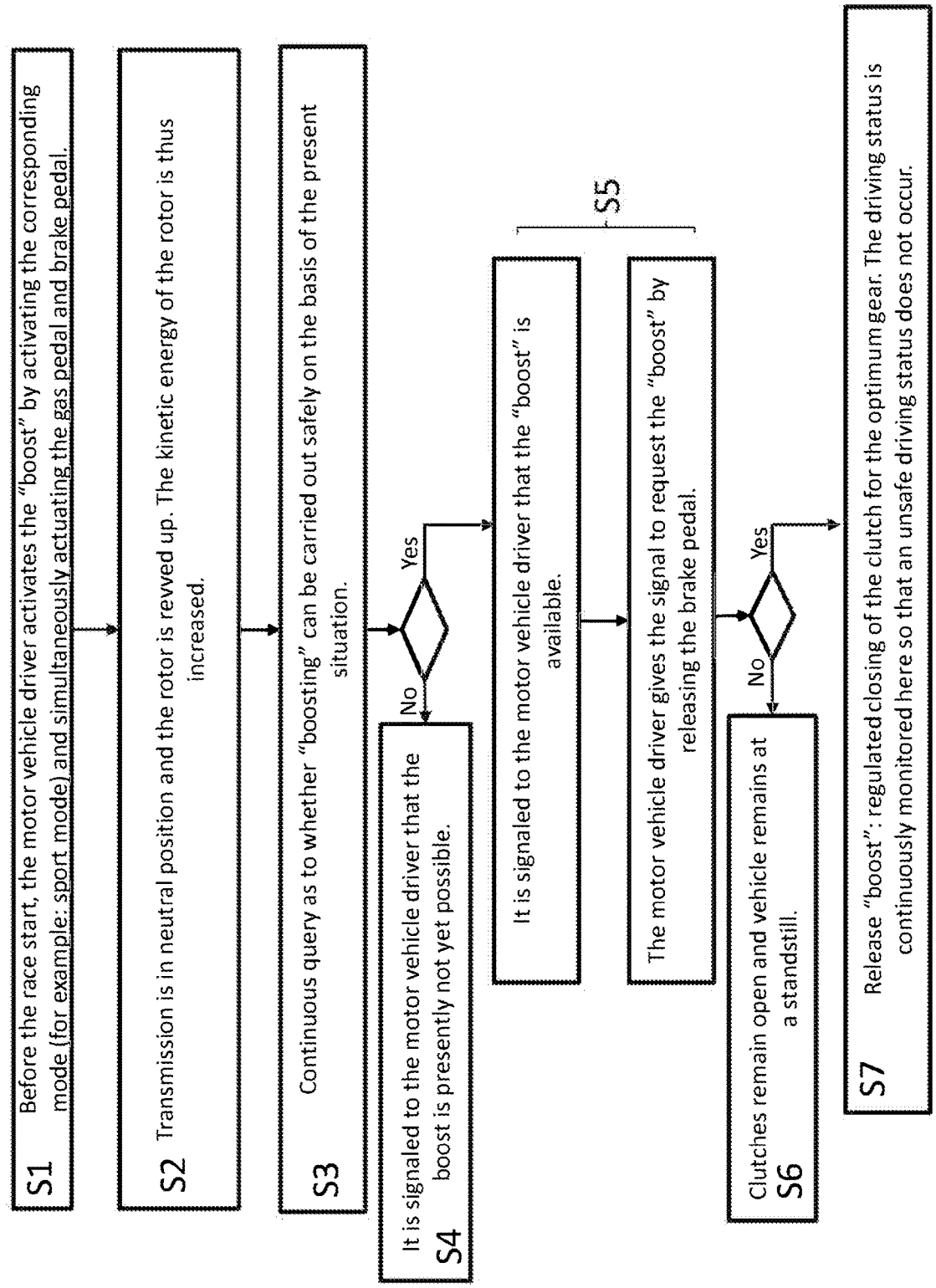
FIG. 6 shows a third flow chart corresponding to a first embodiment of a method according to the present disclosure during a starting process of a motor vehicle.

FIG. 4, FIG. 5, and FIG. 6 each show a flow chart corresponding to a first embodiment of the method according to the present disclosure.

The method is used in each case to increase the power and torque ("boost") during an acceleration process of an electrically operated motor vehicle.

The electrically operated motor vehicle, in which the method is used and to which the flow charts illustrated hereinafter in FIG. 4 to FIG. 6 refer, includes a control unit (not shown), an electrical machine 1 as a drive unit, and a transmission 2, assigned to the electrical machine 1, having at least two gear levels, namely a first gear level 7 and a second gear level 8.

The first gear level 7 is an odd gear level having a higher transmission ratio in comparison to the second gear level 8. Accordingly, the second gear level 8 is an even gear level having a lower transmission ratio in comparison to the first gear level 7. In the present case, the transmission ratio represents the quotient of the speed of the electrical machine (dividend) and the axle speed (divisor).

The first flow chart for the use of the method according to the present disclosure shown in FIG. 4 refers to a driving situation in which cornering of the electrically operated motor vehicle takes place.

In a first method step S1, during the initial braking into the curve, a thrust downshift from the second gear level 8 into the first gear level 7 is automatically initiated by the control unit. An increase of the kinetic energy of the rotor of the electrical machine 1 occurs in this case.

After the first method step S1, it is continuously checked in a further method step S2 whether the prevailing driving situation permits "boosting". Such a check is carried out via a control unit which calculates a "boost status" from present driving data, such as, for example, velocity, lateral acceleration, steering wheel angle, GPS data of the motor vehicle. If a "boost" cannot be carried out safely due to the present driving situation, in a further method step S3, a report is output to the motor vehicle driver that a "boost" is presently not possible or cannot be carried out without safety concerns. If a "boost" can be carried out safely on the basis of the present driving situation, in a further method step S4, it is thus questioned in the control unit whether the motor vehicle driver gives a signal for the "boost" in a predetermined, stored period of time—either by 100% accelerator pedal position or by keeping a special "boost" operating element pressed, such as, for example, a knob or button. If the "boosting" is not initiated, the regular shifting strategy of the motor vehicle is thus continued (method step S5). If the "boosting" is initiated, a traction upshift from the first gear level 7 into the second gear level 8 is thus initiated in a "boost" method step S6 by the control unit upon accelerating out of the curve and the kinetic energy stored in the rotor of the electrical machine 1 is thus released ("boost").

During the "boost" method step S6, the driving status of the motor vehicle is still continuously monitored for safety reasons.

The second flow chart for the use of the method according to the present disclosure shown in FIG. 5 relates to a driving situation in which an overtaking maneuver of the motor vehicle takes place.

In a first method step S1, the motor vehicle driver activates the method by actuating an operating element, such as, for example, a knob, a button, etc.

A thrust downshift from the second gear level 8 into the first gear level 7 is thus initiated by the control unit. An increase of the kinetic energy of the rotor of the electrical machine 1 occurs here (method step S2).

In the further sequence, it is continuously checked whether the prevailing driving situation permits "boosting". Such a check takes place via a control unit which calculates a "boost status" (method step S3) from current driving data, such as, for example, velocity, lateral acceleration, steering wheel angle, GPS data of the motor vehicle.

If a "boost" cannot be carried out safely on the basis of the present driving situation, in a further method step S4, a message is thus output to the motor vehicle driver by the control unit that a "boost" is presently not (yet) possible. If a "boost" can be carried out safely on the basis of the present driving situation, it is signaled to the motor vehicle driver in a further method step S5 that the "boost" is available and at the same time it is questioned in the control unit whether the motor vehicle driver gives a signal for the "boost" in a predetermined, stored period of time—either by 100% accelerator pedal position or by keeping the operating element pressed. If the "boosting" is not initiated, the regular shifting strategy of the motor vehicle is thus continued (method step S6). If the "boosting" is initiated, a traction upshift from the first gear level 7 into the second gear level 8 is thus initiated by the control unit in a "boost" method step S7 and the kinetic energy stored in the rotor of the electrical machine 1 is thus released ("boost").

During the "boost" method step S7, the driving status of the motor vehicle is further continuously monitored for safety reasons.

The third flow chart for the use of the method according to the present disclosure shown in FIG. 6 relates to a driving situation in which a starting process of the motor vehicle takes place.

In a first method step S1, the motor vehicle driver activates the method by activating the corresponding mode, such as, for example, a sport mode, and by actuating one or more operating elements, for example simultaneously actuating a gas pedal and brake pedal of the motor vehicle.

Revving-up of the rotor of the electrical machine 1 is thus initiated by the control unit with opened clutches. An increase of the kinetic energy of the rotor of the electrical machine 1 occurs in this case (method step S2).

In the further sequence, it is continuously checked whether the prevailing situation permits "boosting". Such a check takes place via the control unit, which calculates a "boost status" (method step S3) from current measurement data, such as, for example, slope, coefficient of friction, steering wheel angle, GPS data of the motor vehicle.

If a "boost" cannot be carried out safely on the basis of the present situation, in a further method step S4, a message is thus output to the motor vehicle driver by the control unit that a "boost" is presently not (yet) possible. If a "boost" can be carried out safely on the basis of the present situation, it is thus signaled to the motor vehicle driver in a further method step S5 that the "boost" is available and at the same time it is questioned in the control unit whether the motor vehicle driver gives a signal for the "boost" in a predetermined, stored period of time—for example by releasing the brake pedal. If the "boosting" is not initiated, the clutches 6a, 6b thus remain open and the vehicle remains at a standstill (method step S6). If the "boosting" is initiated, regulated or controlled closing of a clutch 6a, 6b is thus initiated by the control unit in a "boost" method step S7 and the kinetic energy stored in the rotor of the electrical machine 1 is thus released ("boost").

During the "boost" method step S7, the driving status of the motor vehicle is further continuously monitored for safety reasons.

In the following flow chart (FIG. 7), one of many situations is described in which excess drive power can be temporarily stored using a "twin clutch" arrangement corresponding to FIG. 3 and released again a short time later. If the motor vehicle driver wishes to strongly accelerate, it is necessary for a slip control to prevent excessive drive torque from being transmitted to the drive wheels 4a, 4b, in order to avoid a hazardous driving situation. A conventional slip control in an electrically driven motor vehicle reduces the motor torque of the electrical machine 1 if the power requested by the motor vehicle driver cannot be transmitted to the road. The "twin clutch boost" slip control, in contrast, initiates at least partially opening the clutches 5a, 5b to the half-shafts 3a, 3b, in order to reduce the drive torque at the wheels 4a, 4b in a case of slip control. Since the motor torque of the electrical machine 1 is not reduced in the "twin clutch boost" slip control, the rotor of the electrical machine 1 is accelerated and the kinetic energy of the rotor is increased. When the drive wheels 4a, 4b can again transmit more drive power, the kinetic energy stored in the rotor is released by regulated or controlled closing of the clutches 5a, 5b. This results in a "boost". The "twin clutch boost" slip control can be used in any arbitrary case of slip control. To protect the "twin clutches" (first clutch 5a and second clutch 5b) from overheating or damage, the control unit calculates the optimum point in time for the use of the "twin clutch boost" slip control. The control unit detects the predicted duration of the case of slip control from current driving status data of the motor vehicle. If the total duration of the case of slip control cannot be covered by the "twin clutch boost" slip control for reasons of overheating or damage, the remaining part is implemented by a conventional slip control.

Figure 7:
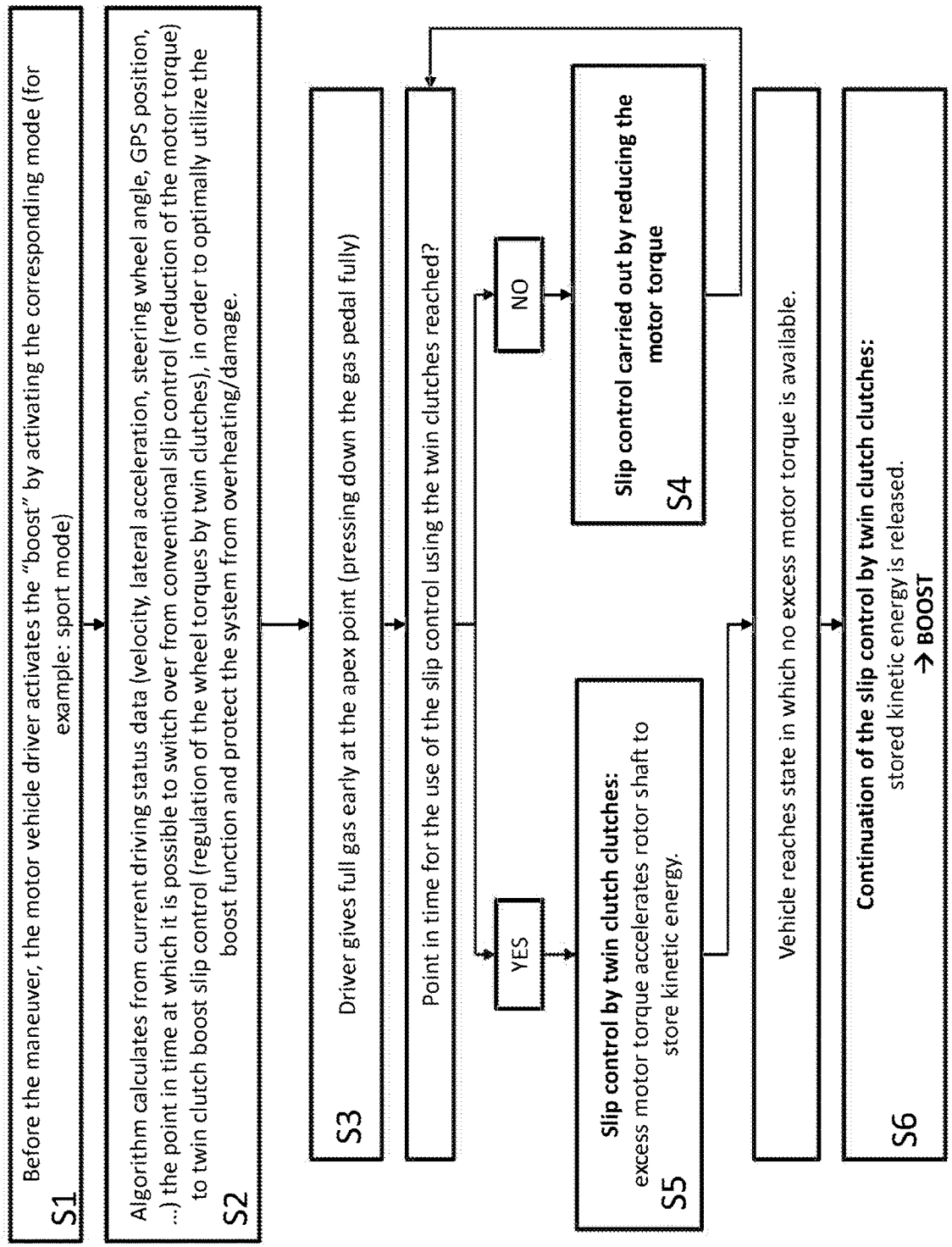
FIG. 7 shows a first flow chart corresponding to a second embodiment of a method according to the present disclosure during cornering of a motor vehicle.

The fourth flow chart for the use of the method according to the present disclosure shown in FIG. 7 relates to a driving situation using a "twin clutch" arrangement, in which cornering of the electrically operated motor vehicle takes place.

In a first method step S1, the motor vehicle driver activates the method by activating the corresponding mode, such as, for example, a sport mode.

In a second method step S2, an algorithm calculates from current driving status data the point in time at which it is possible to switch over from conventional slip control (reduction of the motor torque) to the "twin clutch boost" slip control (regulation of the wheel torques by the "twin clutches" 5a, 5b), in order to optimally utilize the "boost" function and protect the system from overheating or damage.

In a third method step S3, the motor vehicle driver presses on the accelerator pedal of the motor vehicle at the curve exit.

It is continuously checked whether the point in time is reached at which it is possible to switch over from conventional slip control to the "twin clutch boost" slip control. As long as the point in time is not reached, the conventional slip control is used (method step S4).

As soon as the calculated point in time is reached, the "twin clutch boost" slip control is activated and excess motor torque is used to rev up the rotor of the electrical machine 1, in order to store kinetic energy in the rotor (method step S5).

When the vehicle reaches the state in which excess motor torque is no longer available, the kinetic energy is automatically released in the form of a "boost".

In a further mode, for example a super sport mode, the "twin clutch boost" slip control can be permanently activated.

During the entire maneuver, the performance and the safety are additionally increased by individually actuating the individual clutches 5a, 5b ("torque vectoring").

Figure 8:
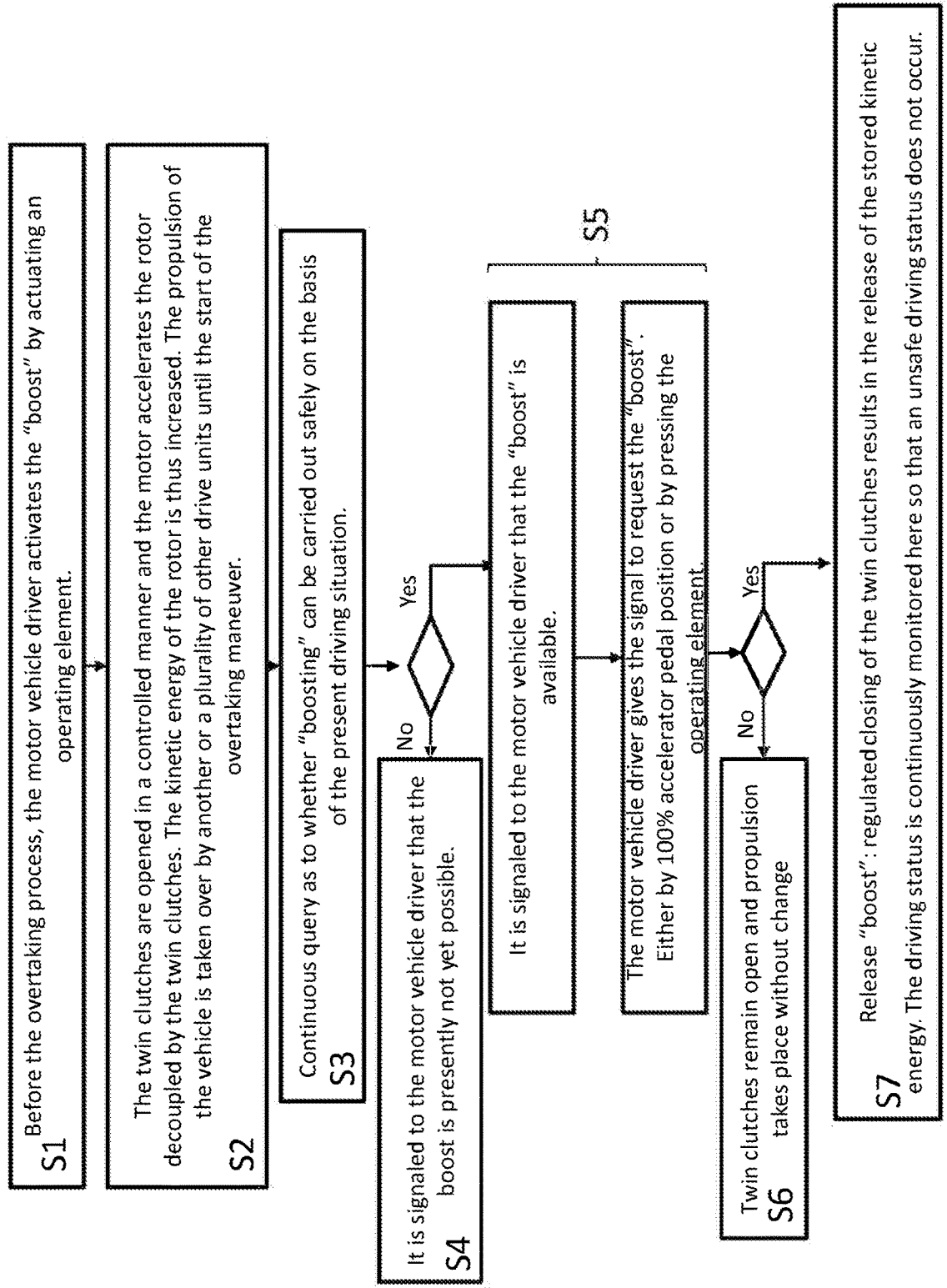
FIG. 8 shows a second flow chart corresponding to a second embodiment of a method according to the present disclosure during an overtaking process of a motor vehicle.

The fifth flow chart for the use of the method according to the present disclosure shown in FIG. 8 relates to a driving situation using a "twin clutch" arrangement, in which an overtaking maneuver of the electrically operated motor vehicle takes place.

In a first method step S1, the motor vehicle driver activates the method by actuating an operating element, such as, for example, a knob or a button.

The "twin clutches", namely the first clutch 5a and the second clutch 5b, are thus opened in a controlled manner and the electrical machine accelerates the rotor of the electrical machine 1 decoupled by the "twin clutches" 5a, 5b. An increase of the kinetic energy of the rotor of the electrical machine 1 occurs here. Another or a plurality of other drive units take over the propulsion of the motor vehicle until the start of the overtaking maneuver (method step S2). One exemplary application would be an all-wheel drive vehicle, which has a driven front axle and a "twin clutch" drive on the rear axle. While the "twin clutches" on the rear axle are open, the front axle takes over the propulsion.

In the further sequence, it is continuously checked whether the prevailing driving situation of the motor vehicle permits "boosting". Such a check takes place via the control unit, which calculates a "boost status" (method step S3) from current driving data, such as, for example, velocity, lateral acceleration, steering wheel angle, GPS data of the motor vehicle.

If a "boost" cannot be carried out safely on the basis of the present driving situation, in a further method step S4, a message is thus output to the motor vehicle driver by the control unit that a "boost" is presently not (yet) possible. If a "boost" can be carried out safely on the basis of the present driving situation, it is signaled to the motor vehicle driver in a further method step S5 that the "boost" is available and at the same time it is questioned in the control unit whether the motor vehicle driver gives a signal for the "boost" in a predetermined, stored period of time—either by 100% accelerator pedal position or by keeping the operating element pressed. If the "boosting" is not initiated, the "twin clutches" 5a, 5b thus remain open and the propulsion of the vehicle takes place without change (method step S6). If the "boosting" is initiated, regulated or controlled closing of the "twin clutches" 5a, 5b is thus initiated in a "boost" method step S7 by the control unit and the kinetic energy stored in the rotor of the electrical machine 1 is thus released ("boost").

During the "boost" method step S7, the driving status of the motor vehicle is further continuously monitored for safety reasons. The individual actuation of the individual clutches ("torque vectoring") additionally improves the performance and safety.

Figure 9:
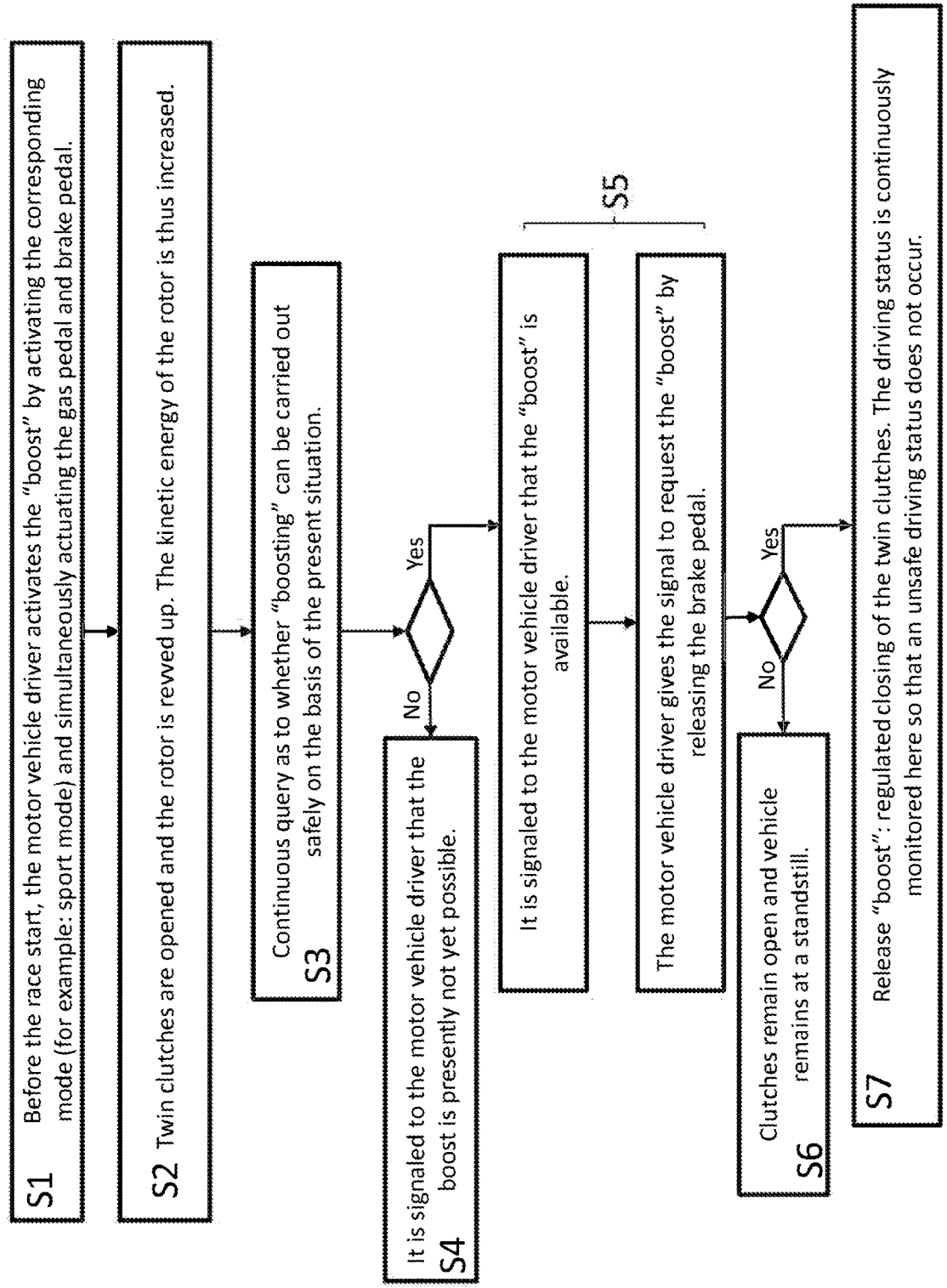
FIG. 9 shows a third flow chart corresponding to a second embodiment of a method according to the present disclosure during a starting process of a motor vehicle.

The sixth flow chart for the use of the method according to the present disclosure shown in FIG. 9 relates to a driving situation using a "twin clutch" arrangement, in which a starting process of the motor vehicle takes place.

In a first method step S1, the motor vehicle driver activates the method by activating the corresponding mode, such as, for example, a sport mode, and, for example, simultaneously actuating the gas pedal and brake pedal.

Revving-up of the rotor is thus initiated by the control unit with opened "twin clutches" 5a, 5b. An increase of the kinetic energy of the rotor of the electrical machine 1 occurs here (method step S2).

In the further sequence, it is continuously checked whether the prevailing situation permits "boosting". Such a check takes place via a control unit, which calculates a "boost status" (method step S3) from current measurement data, such as, for example, slope, coefficient of friction, steering wheel angle, GPS data of the motor vehicle.

If a "boost" cannot be carried out safely on the basis of the present situation, in a further method step S4, a message is thus output to the motor vehicle driver by the control unit that a "boost" is presently not (yet) possible. If a "boost" can be carried out safely on the basis of the present situation, it is thus signaled to the motor vehicle driver in a further method step S5 that the "boost" is available and at the same time it is questioned in the control unit whether the motor vehicle driver gives a signal for the "boost" in a predetermined, stored period of time—for example by releasing the brake pedal. If the "boosting" is not initiated, the clutches 5a, 5b thus remain open and the vehicle remains at a standstill (method step S6). If the "boosting" is initiated, regulated or controlled closing of the "twin clutches" 5a, 5b is thus initiated by the control unit in a "boost" method step S7 and the kinetic energy stored in the rotor of the electrical machine 1 is thus released ("boost").

During the "boost" method step S7, the driving status of the motor vehicle is further continuously monitored for safety reasons. The individual actuation of the individual clutches 5a, 5b ("torque vectoring") additionally improves the performance and safety.

Figure 10:
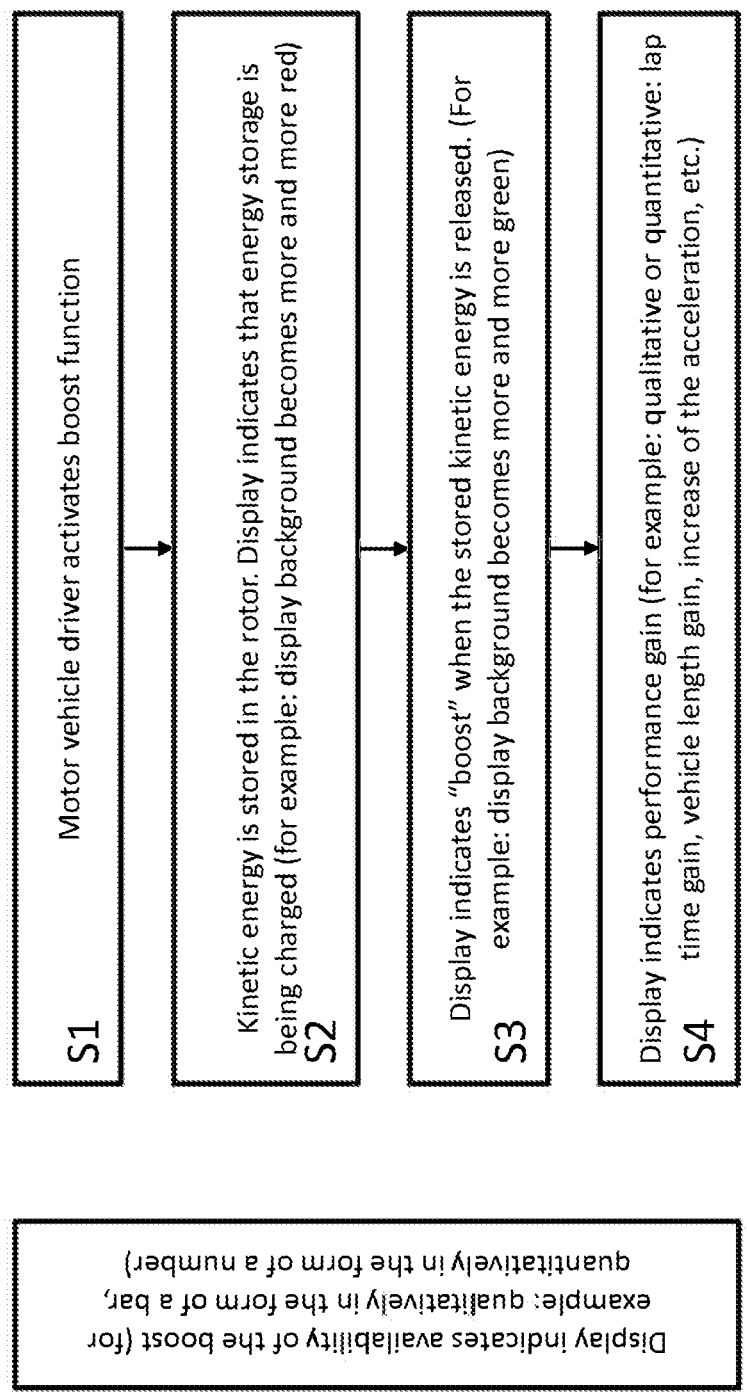
FIG. 10 shows a possible visualization of the "boost" process for both embodiment.

FIG. 10 shows a visualization option of the "boost" method for both embodiments.

The motor vehicle driver activates the "boost" function in the first method step S1.

When the "boost" is charged by storing kinetic energy in the rotor, the control unit transmits data for visualization to a display in the vehicle. The display or the display background changes from very transparent red into a less transparent red when the "boost" is charged. (Method step S2).

In the third method step S3, the kinetic energy is released and the control initiates the "boost" process on a display in the vehicle, for example by a change from a very transparent green display or display background to a less transparent green display or display background.

In the fourth method step S4, a display in the vehicle indicates the performance gain calculated by the control unit.

If the boost is only available to a limited extent for whatever reasons, such as, for example due to wear, the availability of the "boost" can then also be indicated on the display in the vehicle or on a connected device, such as, for example, on a mobile telephone. The availability can be indicated in various forms. Either qualitatively in the form of a bar or quantitatively in the form of a number which indicates approximately how often the "boost" can still be applied.

LIST OF REFERENCE DESIGNATIONS 1 electrical machine
2 transmission
3 axle
3a, 3b half-shaft
4a, 4b wheel
5a first clutch (on first half-shaft)

5b second clutch (on second half-shaft)
6a first clutch (for shifting the first gear level)
6b second clutch (for shifting the second gear level)
7 first gear level (first transmission ratio)
8 second gear level (second transmission ratio)
9 intermediate shaft
S1-S7 method steps

What is claimed is:

1. A method for increasing the power during an acceleration process of an electrically operated motor vehicle having at least one electrical machine, the method comprising the steps of:
    detecting a storage request by at least one control unit,
    initiating an increase of the speed of a rotor of the electrical machine of the motor vehicle by the control unit before an acceleration request and storing kinetic energy in the rotor of the electrical machine, and
    detecting the acceleration request by the control unit and releasing energy stored in the rotor of the electrical machine is released during the acceleration process;
    wherein the storage of the kinetic energy in the rotor of the electrical machine is initiated automatically or manually;
    wherein the storage of the kinetic energy in the rotor is carried out upon detection of an upcoming acceleration process by the drive power of the electrical machine and/or during a running deceleration process by storing the deceleration energy.

2. The method as claimed in claim 1, wherein the release of the stored energy during the acceleration process is initiated manually or automatically.

3. A method for increasing the power during an acceleration process of an electrically operated motor vehicle having at least one electrical machine, the method comprising the steps of:
    detecting a storage request by at least one control unit,
    initiating an increase of the speed of a rotor of the electrical machine of the motor vehicle by the control unit before an acceleration request and storing kinetic energy in the rotor of the electrical machine, and
    detecting the acceleration request by the control unit and releasing energy stored in the rotor of the electrical machine is released during the acceleration process;
    wherein at least one clutch is arranged in a power path between the electrical machine and driven wheels of the motor vehicle, wherein the stored energy in the rotor of the electrical machine is released via at least partially closing the at least one clutch.

4. The method as claimed in claim 3, wherein a transmission is assigned to the electrical machine, wherein the transmission includes the at least one clutch and at least two gear levels, namely a first gear level and a second gear level, wherein the gear levels are shiftable via the at least one clutch.

5. The method as claimed in claim 4, wherein at least partial opening of the at least one clutch is controlled or regulated by the control unit upon detection of a storage request, so that the speed of the rotor of the electrical machine of the motor vehicle is increased and kinetic energy is stored in the rotor of the electrical machine, wherein a release of the kinetic energy stored in the rotor by at least partially closing the at least one clutch is controlled or regulated by the control unit upon detection of an acceleration request.

6. The method as claimed in claim 5, wherein at least partial opening of the at least one clutch is controlled or regulated by the control unit upon detection of an upcoming acceleration process, so that the speed of the rotor of the electrical machine of the motor vehicle is increased and kinetic energy is stored in the rotor of the electrical machine, wherein a release of the kinetic energy stored in the rotor by at least partially closing the at least one clutch is controlled or regulated by the control unit upon detection of an acceleration request.

7. The method as claimed in claim 6, wherein opening of the at least one clutch is controlled or regulated by the control unit upon detection of an upcoming starting process, so that the speed of the rotor of the electrical machine of the motor vehicle is increased and kinetic energy is stored in the rotor of the electrical machine, wherein a release of the kinetic energy stored in the rotor by at least partially closing the at least one clutch is controlled or regulated by the control unit upon the starting of the motor vehicle from a standstill.

8. The method as claimed in claim 7, wherein a thrust downshift from the second gear level into the first gear level is controlled or regulated by the control unit upon detection of a deceleration process, so that the speed of the rotor of the electrical machine of the motor vehicle is increased and kinetic energy is stored in the rotor of the electrical machine, wherein the release of the kinetic energy stored in the rotor of the electrical machine upon a traction upshift from the first gear level into the second gear level is controlled or regulated by the control unit upon detection of an acceleration request.

9. The method as claimed in claim 5, wherein opening of the at least one clutch is controlled or regulated by the control unit upon detection of an upcoming starting process, so that the speed of the rotor of the electrical machine of the motor vehicle is increased and kinetic energy is stored in the rotor of the electrical machine, wherein a release of the kinetic energy stored in the rotor by at least partially closing the at least one clutch is controlled or regulated by the control unit upon the starting of the motor vehicle from a standstill.

10. The method as claimed in claim 5, wherein a thrust downshift from the second gear level into the first gear level is controlled or regulated by the control unit upon detection of a deceleration process, so that the speed of the rotor of the electrical machine of the motor vehicle is increased and kinetic energy is stored in the rotor of the electrical machine, wherein the release of the kinetic energy stored in the rotor of the electrical machine upon a traction upshift from the first gear level into the second gear level is controlled or regulated by the control unit upon detection of an acceleration request.

11. The method as claimed in claim 3, wherein the electrical machine is connected directly or indirectly, via a transmission, in a drive-active manner to an axle of the motor vehicle, wherein the axle includes half shafts and twin clutches of the at least one clutch, with one of the twin clutches on each of the half-shafts.

12. The method as claimed in claim 11, wherein at least partial opening of the clutches is controlled or regulated by the control unit upon detection of a storage request, so that the speed of the rotor of the electrical machine of the motor vehicle is increased and kinetic energy is stored in the rotor of the electrical machine, wherein the release of the kinetic energy stored in the rotor of the electrical machine by at least partially closing the twin clutches during the acceleration process is controlled or regulated by the control unit upon detection of an acceleration request.

13. The method as claimed in claim 12, wherein at least partial opening of the twin clutches is controlled or regulated by the control unit upon detection of an upcoming acceleration process, so that the speed of the rotor of the electrical machine of the motor vehicle is increased and kinetic energy is stored in the rotor of the electrical machine, wherein a release of the kinetic energy stored in the rotor by closing the twin clutches is controlled or regulated by the control unit upon detection of an acceleration request.

14. The method as claimed in claim 13, wherein opening of the clutches is controlled or regulated by the control unit upon detection of an upcoming starting process, so that the speed of the rotor of the electrical machine of the motor vehicle is increased and kinetic energy is stored in the rotor of the electrical machine, wherein a release of the kinetic energy stored in the rotor by at least partially closing the clutches is controlled or regulated by the control unit upon the starting of the motor vehicle from a standstill.

15. The method as claimed in claim 14, wherein at least partial opening of the twin clutches is controlled or regulated by the control unit upon detection of a deceleration process and wherein a release of the kinetic energy stored in the rotor by at least partially closing the clutches is controlled or regulated by the control unit upon detection of an acceleration request.

16. The method as claimed in claim 12, wherein opening of the clutches is controlled or regulated by the control unit upon detection of an upcoming starting process, so that the speed of the rotor of the electrical machine of the motor vehicle is increased and kinetic energy is stored in the rotor of the electrical machine, wherein a release of the kinetic energy stored in the rotor by at least partially closing the clutches is controlled or regulated by the control unit upon the starting of the motor vehicle from a standstill.

17. The method as claimed in claim 12, wherein at least partial opening of the twin clutches is controlled or regulated by the control unit upon detection of a deceleration process and wherein a release of the kinetic energy stored in the rotor by at least partially closing the clutches is controlled or regulated by the control unit upon detection of an acceleration request.

18. A method for increasing the power during an acceleration process of an electrically operated motor vehicle having at least one electrical machine, the method comprising the steps of:
  detecting a storage request by at least one control unit,
  initiating an increase of the speed of a rotor of the electrical machine of the motor vehicle by the control unit before an acceleration request and storing kinetic energy in the rotor of the electrical machine, and
  detecting the acceleration request by the control unit and releasing energy stored in the rotor of the electrical machine is released during the acceleration process;
  wherein the storage of the kinetic energy in the rotor is carried out upon detection of an upcoming acceleration process by the drive power of the electrical machine and/or during a running deceleration process by storing the deceleration energy.

* * * * *